US012241996B1

(12) United States Patent
Fan et al.

(10) Patent No.: US 12,241,996 B1
(45) Date of Patent: Mar. 4, 2025

(54) ANTENNA ARRAY CALIBRATION FOR VEHICLE RADAR SYSTEMS

(71) Applicant: Waymo LLC, Mountain View, CA (US)

(72) Inventors: Ryan Fan, Mountain View, CA (US); Kenneth Ho, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 747 days.

(21) Appl. No.: 17/375,707

(22) Filed: Jul. 14, 2021

(51) Int. Cl.
*G01S 7/40* (2006.01)
*G01S 7/41* (2006.01)

(52) U.S. Cl.
CPC .............. *G01S 7/40* (2013.01); *G01S 7/4017* (2013.01); *G01S 7/4021* (2013.01); *G01S 7/412* (2013.01); *G01S 7/415* (2013.01)

(58) Field of Classification Search
None
See application file for complete search history.

(56) References Cited

U.S. PATENT DOCUMENTS

| | | | |
|---|---|---|---|
| 9,733,350 B2 | 8/2017 | Stainvas Olshansky et al. | |
| 10,732,260 B2 | 8/2020 | Ajanoh | |
| 10,739,438 B2 | 8/2020 | Harrison | |
| 10,768,304 B2 | 9/2020 | Englard et al. | |
| 2020/0041612 A1 | 2/2020 | Harrison | |
| 2020/0064441 A1* | 2/2020 | Alcalde | G01S 13/58 |
| 2020/0191914 A1 | 6/2020 | Kunz et al. | |
| 2020/0249315 A1 | 8/2020 | Eshet et al. | |
| 2020/0249316 A1 | 8/2020 | Harrison | |

(Continued)

FOREIGN PATENT DOCUMENTS

| | | |
|---|---|---|
| CN | 103018727 A | 4/2013 |
| CN | 102360528 B | 8/2013 |

(Continued)

OTHER PUBLICATIONS

Randy S. Depoy Jr. et al., "Mitigating atmospheric phase-errors in SAL data using model-based reconstruction", 2019 IEEE National Aerospace and Electronics Conference (NAECON), Jul. 2019.

(Continued)

*Primary Examiner* — Whitney Moore
(74) *Attorney, Agent, or Firm* — McDonnell Boehnen Hulbert & Berghoff LLP

(57) ABSTRACT

An example method for using antenna array calibration to adjust radar unit operation involves receiving radar data from a radar unit coupled to a vehicle during vehicle operation in an environment, where the radar unit receives the radar data from the environment via an antenna array of the radar unit. The method also involves detecting an object in the environment based on the radar data, determining that the detected object satisfies a set of conditions, and, in response to the set of conditions being satisfied, estimating a first phase array offset for the antenna array. The method also involves comparing the first phase array offset with a second phase array offset that represents a prior calibration for the radar unit, and, based on a difference between the first and second phase array offsets exceeding a threshold difference, adjusting operation of the radar unit according to the first phase array offset.

19 Claims, 9 Drawing Sheets

(56) References Cited

U.S. PATENT DOCUMENTS

| | | | |
|---|---|---|---|
| 2020/0371198 A1 | 11/2020 | Schoor | |
| 2020/0400810 A1 | 12/2020 | Cho et al. | |
| 2020/0408529 A1 | 12/2020 | Zeng et al. | |
| 2021/0003404 A1 | 1/2021 | Zeng et al. | |
| 2021/0072350 A1* | 3/2021 | Loesch | G01S 7/42 |

FOREIGN PATENT DOCUMENTS

| | | | |
|---|---|---|---|
| CN | 110378204 A | 10/2019 | |
| CN | 110412559 A | 11/2019 | |
| CN | 110824912 A | 2/2020 | |
| CN | 111694019 A | 9/2020 | |
| EP | 3511733 A3 | 11/2019 | |
| WO | 2020113160 A2 | 6/2020 | |

OTHER PUBLICATIONS

Kihong Park et al., "High-Precision Depth Estimation Using Uncalibrated LiDAR and Stereo Fusion", IEEE Transactions on Intelligent Transportation Systems, vol. 21, Issue 1, pp. 321-335, Jan. 2020.

Shijie Bai et al., "Nonlinear correction of frequency-modulated continuous-wave lidar frequency modulation based on singular value decomposition-least square algorithm", SOptical Engineering, vol. 59, Issue 5, May 12, 2020.

* cited by examiner

ANTENNA ARRAY CALIBRATION FOR VEHICLE RADAR SYSTEMS

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments describe operations for online array calibration of a vehicle radar system that can be performed during vehicle operation. Example embodiments can involve gathering diagnostic data for each of a plurality of time intervals, compiling the diagnostic data over multiple intervals, center frequencies, and waveform types to assess the performance of individual vehicle radar unit(s) of a vehicle radar system, and updating phase calibration data as-needed. Operation of the vehicle radar system can thus be adjusted based on the updated phase calibration data and in real-time as the vehicle operates.

In one aspect, an example method is provided. The method involves receiving, at a computing device, radar data from a radar unit coupled to a vehicle during vehicle operation in an environment, where the radar unit receives the radar data from the environment via an antenna array of the radar unit. The method also involves detecting an object in the environment based on the radar data. The method also involves determining that the detected object satisfies a set of conditions. The method also involves estimating a first phase array offset for the antenna array responsive to determining that the detected object satisfies the set of conditions. The method also involves performing a comparison between the first phase array offset and a second phase array offset, where the second phase array offset represents a prior calibration for the radar unit. The method also involves adjusting operation of the radar unit according to the first phase array offset based on a difference between the first phase array offset and the second phase array offset exceeding a threshold difference.

In another aspect, an example system is provided. The system includes a radar unit coupled to a vehicle. The system also includes a computing device coupled to the vehicle, wherein the computing device is configured to receive radar data from the radar unit coupled to the vehicle during vehicle operation in an environment, where the radar unit receives the radar data from the environment via an antenna array of the radar unit. The computing device is also configured to detect an object in the environment based on the radar data. The computing device is also configured to determine that the detected object satisfies a set of conditions. The computing device is also configured to estimate a first phase array offset for the antenna array responsive to determining that the detected object satisfies the set of conditions. The computing device is also configured to perform a comparison between the first phase array offset and a second phase array offset, where the second phase array offset represents a prior calibration for the radar unit. The computing device is also configured to adjust operation of the radar unit according to the first phase array offset based on a difference between the first phase array offset and the second phase array offset exceeding a threshold difference.

In another aspect, an example method for calibrating a radar unit of a vehicle during operation of the vehicle is provided. The method involves navigating a vehicle having a radar unit past a plurality of objects at a first time frame, where a computing system coupled to the vehicle uses radio signals received by the radar unit while the vehicle is navigating to identify each object, and where each object is associated with a distance, a speed, and exceeding a signal-to-noise ratio. The method also involves navigating the vehicle past the plurality of objects at a subsequent time frame. The method also involves adjusting operation of the radar unit based on a comparison of the radio signals received at the first time frame and the subsequent time frame.

In yet another aspect, an example method is provided. The method involves identifying, by a computing device coupled to a vehicle, from radar data obtained by a vehicle radar system coupled to the vehicle, a set of peaks that meet a set of conditions and are each expected to be representative of a single target object from an environment of the vehicle. The method also involves retrieving, by the computing device, training data representing the identified set of peaks, where the training data corresponds to a plurality of channels of the vehicle radar system. The method also involves extracting, by the computing device, from the training data, error data, where the error data comprises a portion of the training data other than portions representing the target objects. The method also involves in response to the extracting, calculating, by the computing device, spatially invariant corrections and spatially variant corrections of the error data. The method also involves adjusting, by the computing device, operation of the vehicle radar system based on the calculated spatially invariant corrections and the calculated spatially variant corrections.

In yet another aspect, an example system is provided. The system includes a vehicle having a vehicle radar system. The system also includes a computing device. The computing device includes at least one processor and at least one memory. The at least one processor is configured to execute program instructions stored in the at least one memory so as to carry out operations. The operations include identifying, from radar data obtained by the vehicle radar system, a set of peaks that meet a set of conditions and are each expected to be representative of a single target object from an environment of the vehicle. The operations also include retrieving training data representing the identified set of peaks, where the training data corresponds to a plurality of channels of the vehicle radar system. The operations also include extracting, from the training data, error data, where the error data comprises a portion of the training data other than portions representing the target objects. The operations also include in response to the extracting, calculating spatially invariant corrections and spatially variant corrections of the error data. The operations also include adjusting operation of the vehicle radar system based on the calculated spatially invariant corrections and the calculated spatially variant corrections.

In yet another example, an example non-transitory computer readable medium having stored therein program instructions executable by a computing device to cause the computing device to perform operations is provided. The operations include identifying, from radar data obtained by a vehicle radar system coupled to a vehicle, a set of peaks that meet a set of conditions and are each expected to be representative of a single target object from an environment of the vehicle. The operations also include retrieving training data representing the identified set of peaks, where the training data corresponds to a plurality of channels of the vehicle radar system. The operations also include extracting, from the training data, error data, where the error data comprises a portion of the training data other than portions representing the target objects. The operations also include in response to the extracting, calculating spatially invariant corrections and spatially variant corrections of the error data. The operations also include adjusting operation of the vehicle radar system based on the calculated spatially invariant corrections and the calculated spatially variant corrections.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
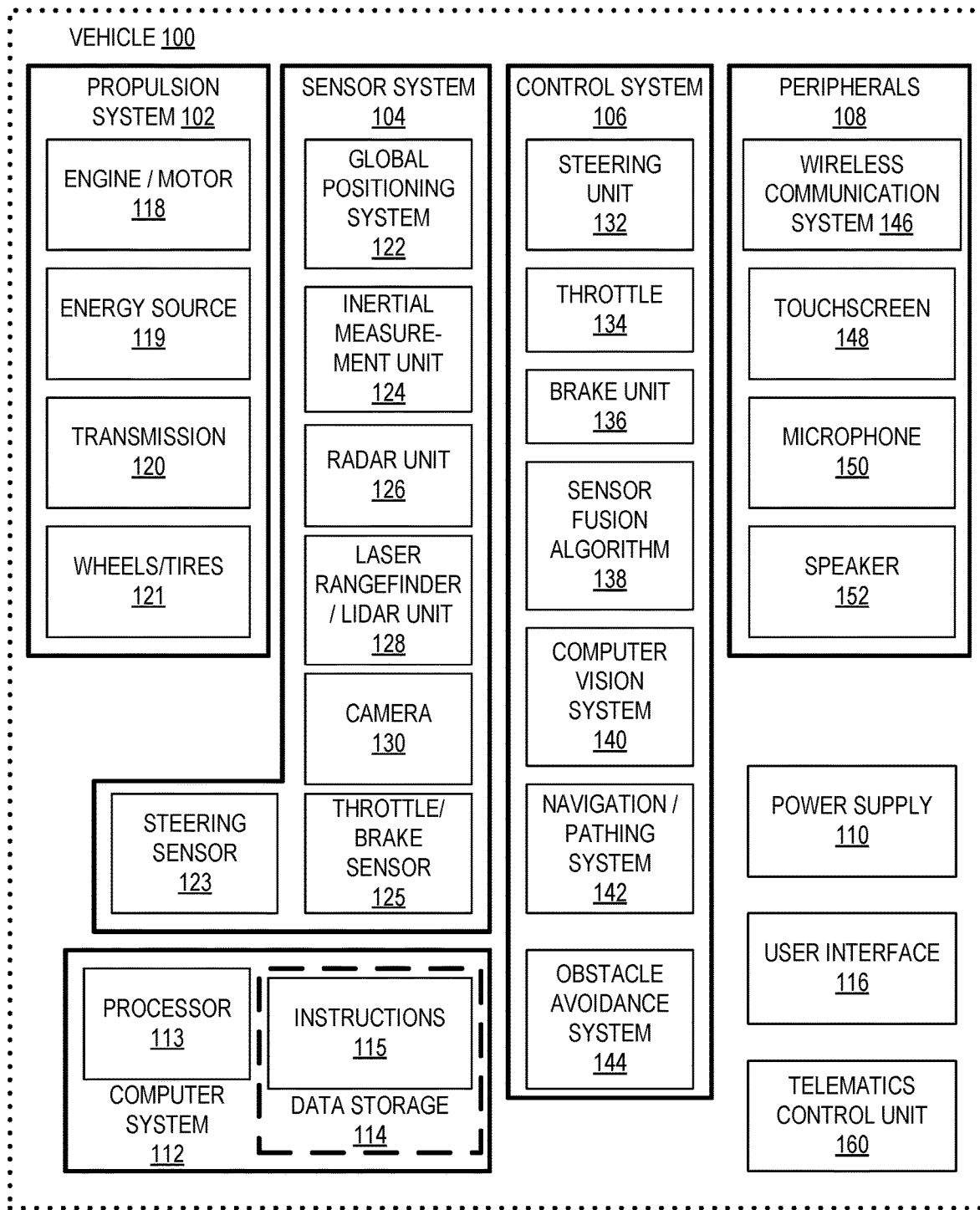
FIG. 1 is a functional block diagram illustrating a vehicle, according to one or more example embodiments.
Figure 2A:
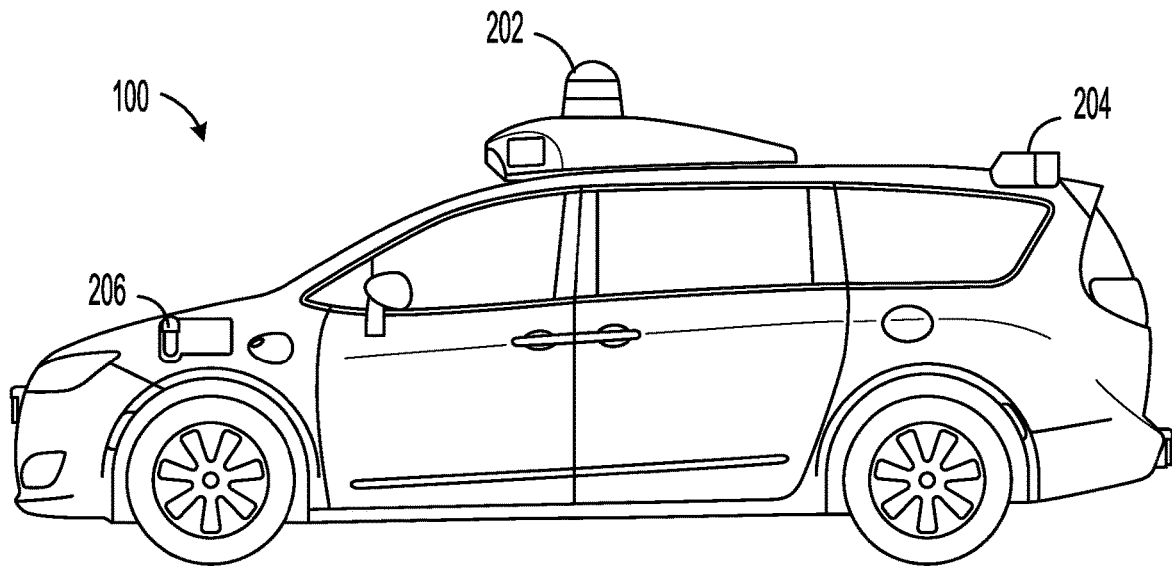
FIG. 2A illustrates a side view of a vehicle, according to one or more example embodiments.
Figure 2B:
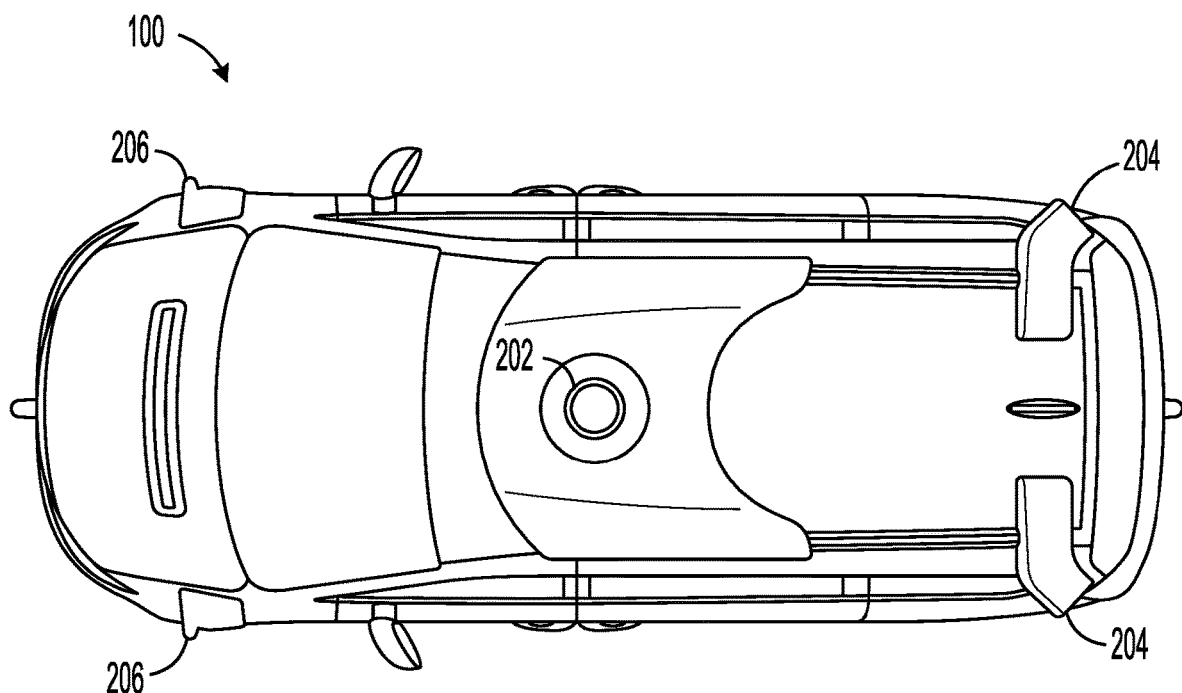
FIG. 2B illustrates a top view of a vehicle, according to one or more example embodiments.
Figure 2C:
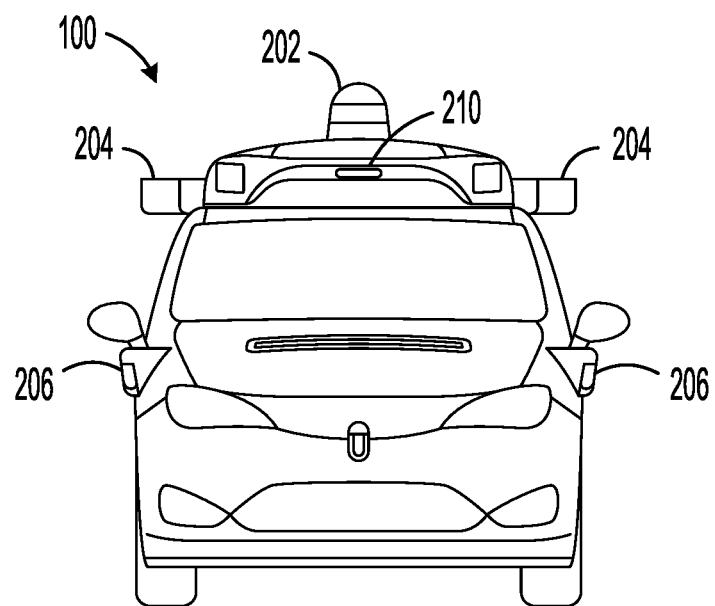
FIG. 2C illustrates a front view of a vehicle, according to one or more example embodiments.
Figure 2D:
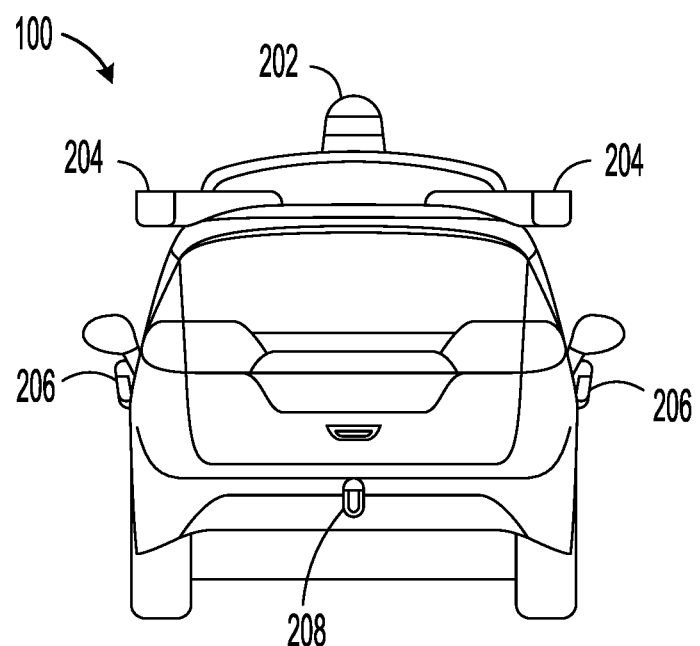
FIG. 2D illustrates a back view of a vehicle, according to one or more example embodiments.
Figure 2E:
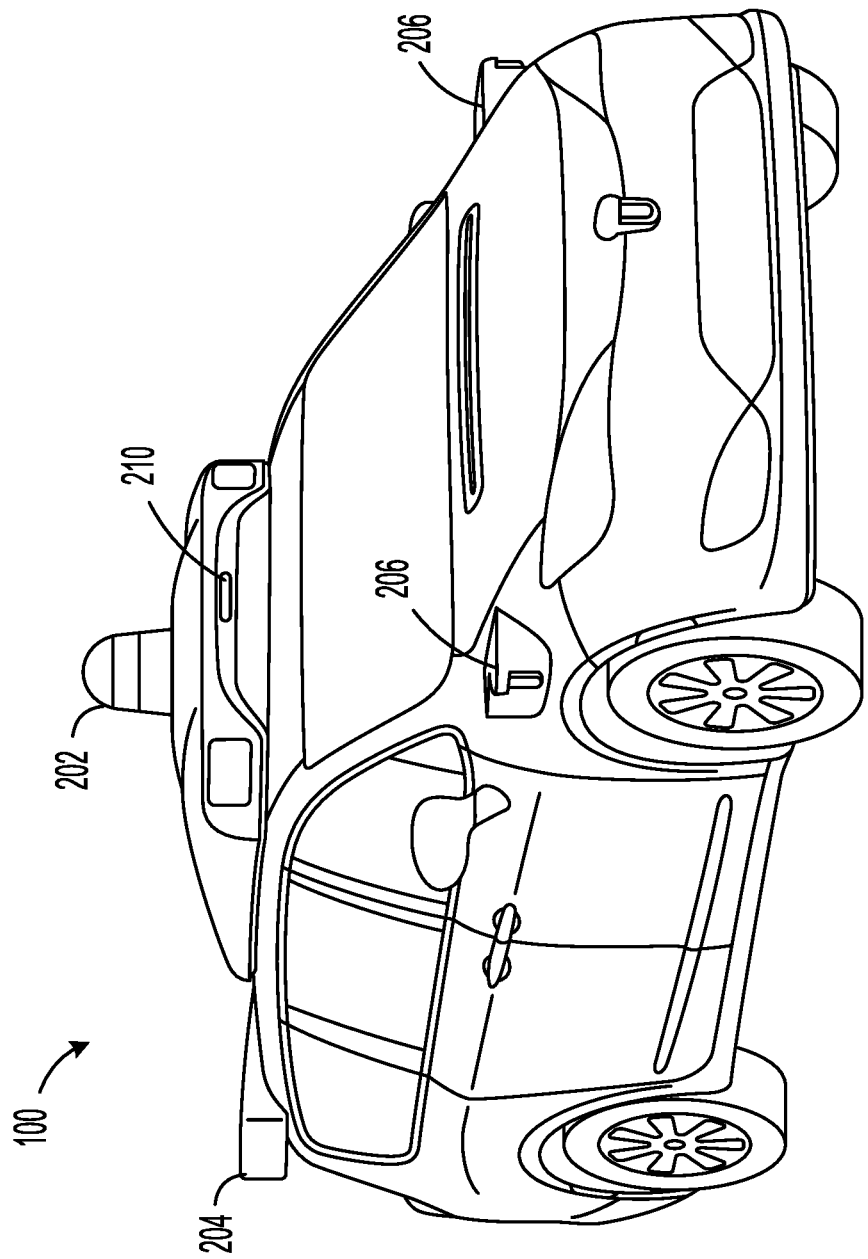
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system can use one or more antennas (radiating elements) to emit radar signals into an environment, which can enable subsequent measurements of aspects of the environment. Upon coming into contact with surfaces in the environment, the radar signals can scatter in multiple directions with some radar signals passing through some surfaces while others reflect off surfaces and travel back towards one or more reception antennas of the radar system. A radar processing system (e.g., a field programmable gate array (FPGA) and/or another processing unit) may process received radar reflections to generate two dimensional (2D) and/or three dimensional (3D) measurements that represent aspects of the environment, such as the positions, orientations, and movements (including non-movements) of nearby objects and other surfaces located in the surrounding environment.

Because a radar system can be used to measure distances and motions of nearby objects and other surfaces, vehicles are increasingly incorporating vehicle radar systems that can assist with vehicle navigation, obstacle detection and avoidance, and boost overall vehicle safety in other ways. For instance, radar can be used to detect and potentially identify the positions, orientations, and movements (including non-movements) of nearby vehicles, bicycles, pedestrians, and animals surrounding a vehicle. Radar can also provide information about other features in the vehicle's surrounding environment, such as the location, orientation, and arrangement of road boundaries, road conditions (e.g., smooth or bumpy surfaces), weather conditions (e.g., wet or snowy roadways), and traffic signs and signals, and other infrastructure.

In some applications, a vehicle radar system can be used to assist a driver controlling the vehicle enabling a vehicle system to generate alerts, such as when the vehicle drifts outside its lane and/or when the vehicle travels too closely to another vehicle or object. Radar can also be used to help enable autonomous operations by the vehicle. In some instances, radar can help an autonomous vehicle detect and measure the surrounding environment to assist vehicle control systems.

A vehicle radar system can include one or multiple radar units positioned at various locations on a vehicle. For instance, the vehicle may include forward-facing radar units, side-facing radar units, and/or rear-facing radar units. The radar units can include one or multiple antenna arrays in various configurations, such as uniform linear arrays (ULAs), planar arrays, and/or other configurations. In some instances, radar units can include multiple types of arrays that can be used to transmit and/or receive radar signals. In addition, the vehicle radar system can be a synthetic aperture radar (SAR) imaging system, a multiple-input multiple-output (MIMO) system and/or a hybrid system (e.g., MIMO-SAR). Radar units can be configured to operate and adjust various parameters, such as different waveforms, frequencies, timing, and in different directions relative to the vehicle.

Antenna arrays on radar units can be operated as phased arrays in some implementations. A phased array can produce a beam that can be digitally steered in desired directions to measure particular regions of the surrounding environment. By using multiple antennas in an array or multiple arrays to perform beamforming, the vehicle radar system can achieve spatial selectivity when measuring aspects of the surrounding environment. To perform beamforming, a transmitter may feed electromagnetic energy to individual antennas within an array with the correct phase relationship to cause the radio waves from the separate antennas to add together in a way that increases the radiation in a desired direction and to suppress radiation in undesired directions (i.e., forms a beam). In some instances, the power from the transmitter can be fed to antennas through phase shifts (i.e., phase array) controlled by a computing system (e.g., a field programmable gate array (FPGA)), which can alter the phase electronically enabling the beam of radio waves to be steered in desired directions. As an example result, a vehicle radar system can transmit phase-shifted control signals for each individual antenna in a phased antenna array on a radar unit to modify the pointing direction of a combined RF signal (e.g., phased array beam steering) transmitted by the radar unit.

Phased arrays on different radar units located on the vehicle can direct RF beams in particular directions relative to the vehicle to detect aspects of the surrounding environment. For example, a vehicle radar system may use radar units to steer beams in multiple directions surrounding the vehicle to measure and map 360 degrees extending around the vehicle. The vehicle radar system may use beamforming (spatial filtering) to cause signals at particular angles to experience constructive interference while others experience destructive interference. The combination of constructive interference, destructive interference, and nulls can create beams that can be directed toward particular targets or regions in the environment.

In some applications, beamforming can involve transmitting signal (pulses) from each antenna in an array at slightly different times so that every signal (pulse) hits a target surface or sets of surfaces at approximately the same time. By staggering transmissions slightly, the antenna array can produce a focused main beam that can be directed and used to measure portions of the surrounding environment. Similarly, reception of signals that are reflected off surfaces in the environment can involve combining delayed signals from antennas in the array at slightly different times. In the receive beamformer, the signal from each antenna may be amplified by a different weight. Different weight patterns can be used to achieve the desired sensitivity patterns for radar units operating as part of the vehicle radar system. In addition, in some instances, adaptive beamforming can be used to detect and estimate the signal of interest at the output of an antenna array by means of optimal spatial filtering (e.g., least-squares) and interference rejection. When receiving signals from the environment, information from different antennas can be combined in a way where the expected pattern of radiation is observed.

The time delay applied during transmission of signals and/or reception of signals can be described as a phase shift, which enables the antenna array to operate as a phased array. The phase shift can specify one or more phases for an antenna array to perform beam steering.

The constructive interference that creates the combined RF signal from an antenna array can increase the main beam aimed in the desired direction of the environment, but it can also result in the presence of radiation in undesired directions, known as sidelobes. Sidelobes can negatively reduce the amount of power contributed to the main beam that is being used by the radar unit to measure a particular portion of the environment. In addition, sidelobes can cause noise to appear within radar data, which can impact the accuracy of object detection and measurement. Thus, in some applications, it can be particularly desirable to keep the array sidelobe level below a particular threshold (e.g., −60 decibels below the carrier (dBc)) and at a particular angular resolution (e.g., 1 degree or less) in order for the radar system to be able to separate far range, closely-spaced target objects with a large disparity.

Vehicle radar systems can be calibrated to produce beams that achieve desirable sidelobe performance. In some examples, calibration data can be used to coordinate the transmission pattern and/or reception pattern to ensure gains are focused in the main beam and sidelobes are minimized. For instance, calibration data can be used to adjust phase offsets applied when transmitting and/or receiving radar signals. The calibration data can be used by computing devices within the vehicle radar system, including FPGAs associated with particular radar units.

In practice, vehicle radar systems are typically calibrated offline using test chambers with precisely-configured, known targets. For example, using known targets and geometries, offline calibration data can be collected in multiple directions, at various ranges, and across signals having a variety of transmission parameters for individual radar units that are implemented on vehicles and used by the vehicle radar system. The offline calibration data generated via a test chamber can be used to develop and refine radar software and firmware implemented at computing devices and FPGAs.

Although offline calibration can initially calibrate a vehicle radar system in a manner that can enable accurate performance by individual radar units, the offline calibration process can take a large amount of resources and time to complete. In addition, the offline calibration data can become less effective over time as radar units on a vehicle degrade as the vehicle operates in various environments and conditions. Debris, temperature changes, weather (e.g., rain, snow; and wind), unintentional contact, and other elements can impact antenna arrays on radar units and cause performance to degrade over time. The offline calibration data may not enable the radar units to operate as effectively as an example result of performance degradation. Thus, as the vehicle radar system degrades over time and temperature, and due to wear and tear, offline calibration data can become mismatched from the true array error, which can impact the beam steering capabilities of individual radar units and result in variance and degradation in array sidelobe performance.

In some instances, vehicle systems may fail to recognize when radar performance has degraded. For instance, human supervision or cross-sensor validation may be needed to detect the degradation, upon which the vehicle radar system can be removed from operation and re-calibrated offline before being put back into operation. Recalibration of the vehicle radar system offline, however, limits the vehicle's use and can be both time and cost intensive.

To overcome drawbacks associated with offline calibration of a vehicle radar system, example embodiments of the present disclosure describe techniques for performing online calibration of the vehicle radar system that can be completed as a vehicle operates in various environments. The online calibration techniques can be used to generate calibration data that can refine and improve the performance of antenna arrays on individual radar units. The generated calibration data can be used to increase the accuracy of phase offsets used by the vehicle radar system for beamforming. In some examples, the calibration data generated during vehicle operations can be used to update software and/or firmware implemented on FPGAs and/or other computing devices within the vehicle radar system. By performing example online calibration techniques described herein, a vehicle may continuously (or periodically) calibrate the performance of antenna arrays (and the vehicle radar system in general) while avoiding the downtime and costs associated with offline calibration.

Example online calibration techniques can be performed autonomously and locally by one or more computing devices on the vehicle. In some instances, one or more remote computing devices can assist with the online calibration technique. In some examples, one or more computing devices can gather diagnostic data for multiple time intervals (e.g., radar returns accumulated within a variety of coherent processing intervals (CPIs)), and compile the diagnostic data over multiple intervals, center frequencies, and waveform types to assess the performance of the vehicle radar system and to update phase calibration data as-needed. As an example result, online array calibration techniques can decrease sidelobe levels by reducing array errors, thereby producing a sharpened mainlobe and reduced close—in sidelobes.

To further illustrate, an example embodiment may be performed by a computing system coupled to a vehicle. The computing system may include one or more computing devices (e.g., processors and FPGAs) that can detect one or more objects in the environment based on radar data received via an antenna array of a radar unit of the vehicle. In some instances, the computing system can be configured to determine that the detected object(s) each satisfy a set of conditions prior to performing online calibration using the detections. For example, the radar data indicative of the detected object(s) (e.g., a set of peaks of the radar data) may be required to meet one or more conditions, such as that the radar data (i) exceeds a particular signal-to-noise ratio (SNR) threshold, (ii) exceeds a range threshold, and (iii) represents a Doppler for the detected object that falls within a predetermined Doppler frequency range. Within examples, application of these conditions can serve as a filter that helps the computing system select portions of the radar data (e.g., peaks) that are each likely to represent a single target object (e.g., a car, truck, street sign, or another large and/or metallic object) associated with a high radar cross section (RCS) that can make calibration determination more accurate.

The computing system can estimate a first phase array offset for the antenna array of the radar unit using detections of objects that meet the conditions used to filter desirable detections from less optimal object detections. In some instances, the computing system may retrieve training data for the detected objects (e.g., training data for each peak in the set of peaks representing object detections). The training data can correspond to channels of the vehicle radar system. For example, the training data can be from 16 receiver channels across 4 time divisions, or 64 virtual channels. The training data can provide returns obtained across the different reception antennas within the antenna array. The computing system can also determine the angle for each object detection used for calibration. For instance, a FPGA can associate an angle for each peak and can sort the peaks into azimuth angle bins. In some examples, multiple objects can be used for online calibration as a vehicle operates. For instance, to improve the quality of the diagnostic data for use in online calibration, the system may use a large variety of peaks selected across a large variety of angles.

The computing system can condition the training data, which can involve extracting (e.g., filtering, obtaining) error data (e.g., phase error data, namely, phase noise) from the training data. For example, conditioning the training data can involve filtering portions of the training data that represents multiple target objects. In some examples, the computing system can apply one or more smoothing processes, such as a phase calibration, a motion compensation, and a linear phase compensation. The computing system may apply one or more of these processes to the peaks to help differentiate from noise and other portions that might not correspond to the detected objects.

The computing system can estimate one or more phase array offsets for the radar unit based on the extracted error data. For example, the computing system can compute spatially invariant corrections and spatially variant corrections of the error data and use the computed spatially invariant corrections and spatially variant corrections to determine a phase array offset. The computing system can also update a phase calibration table based on the phase array offset, such as the phase calibration table used by a FPGA associated with a particular radar unit. In some instances, the spatially invariant errors can contribute to degraded sidelobe performance, which the compute spatially invariant corrections can reduce.

In some examples, the computing system may compare the determined phase array offset to another phase array offset that represents a prior calibration for the radar unit. Particularly, the comparison may be used to check if the existing phase array offset provides accurate radar results or if the newly determined phase array offset would increase accuracy for subsequent radar operations. For example, if the difference between the two offsets exceeds a threshold difference, the computing system may be configured to responsively adjust operation of the radar unit according to the newly determined phase array offset. As an example, the computing system can generate an array impulse response and, from the array impulse response, compute peak sidelobe level and root-mean-square (RMS) sidelobe level metrics for analysis. If the sidelobe metrics are shown to improve to a degree exceeding the threshold difference relative to prior sidelobe metrics corresponding to the second phase array offset, the computing system may update the calibration coefficients based on the new phase array offset.

Example online calibration techniques can reduce the time and resources used to maintain consistent desired performance for the radar system while enabling the vehicle to perform other operations, such as navigation to a destination. The techniques can also enable the vehicle radar system to periodically check the quality of a current calibration data set and update the calibration data set as-needed before an undesired level of performance degradation occurs. As an example result, the vehicle radar system can maintain desired performance and adapt to changes in calibration data quality without having to take the vehicle out of operation for recalibration. Example embodiments can also be implemented across a variety of radar array topologies (e.g., multiple-input multiple-output (MIMO), single-input, multiple-output (SIMO)) and waveforms (e.g., low, medium, or high pulse repetition frequency (PRF)).

The disclosed online calibration operations can also facilitate continuous monitoring of the instantaneous array error in the field without requiring a calibration chamber or highly-controlled targets. Instead, example online calibration techniques can use live field data collected during typical operations by the vehicle. That is, from a subset of the field data, the computing system can select suitable training examples to estimate the array error within radar returns obtained from various environments, and once the array error is extracted and estimated from the field training examples, the computing system can update the array calibrations in real-time to maintain accurate performance. This can eliminate the need to remove a vehicle and its radar system from service and can significantly decrease the downtime of the radar system.

Additionally, the disclosed operations can correct for array errors that vary as a function of direction. These varying errors can be caused by non-uniform wear to the radar components of radar unit(s) on the vehicle (e.g., a radome) due to debris strikes or common road grime. The spatially variant estimation and other calibration aspects described herein can be used for high performance custom digital beamforming, arbitrary beam structures, and orthogonal projections.

In some examples, the disclosed operations for online calibration can be performed locally by one or more processing units onboard a vehicle, such as a processing unit of a vehicle radar system or a central computing system configured to control the vehicle radar system. In other examples, the disclosed operations for online calibration can be executed using assistance from one or more external computing devices, such as a remote server or cloud computing system with which a fleet of vehicles are in communication. In some examples, disclosed online calibration techniques can be performed after implementing a radar software update received over-the-air from a remote computing system, such as a central system.

Some examples may involve a vehicle radar system that uses one or more passive phased arrays, in which the antenna elements are connected to a single transmitter and/or receiver. For example, a radar unit may use one exciter for the entire antenna array. In some examples, a vehicle radar system may include one or more active phased arrays, in which each antenna element has an analog transmitter/receiver module that can create the phase shifting required to electronically steer the antenna beam. In some instances, a radar unit may be able to radiate multiple beams of radio waves at multiple frequencies in different directions simultaneously. Some examples can further involve hybrid applications that incorporate both passive and active phase arrays. In addition, digital beam forming phase arrays can be used in some examples. The signal at each element can be digitized by the receiver/exciter. For example, a FPGA can digitally form the antenna beams, which enables multiple simultaneous antenna beams to be formed.

A vehicle radar system may use multiple receive apertures (antennas) to receive electromagnetic waves radiating in the vehicle's environment. For instance, the vehicle radar system may use antennas (e.g., a linear array of antennas) on one or more radar units coupled to the vehicle to receive radiating electromagnetic waves in the area that originated from one or more external emitters. By using multiple receive apertures, a processing unit may analyze the received electromagnetic waves to determine a line of bearing to the emitter. For example, the processing unit may use a Frequency Difference of Arrival (FDOA) process and/or a Time Difference of Arrival (TDOA) process to determine a location of the external emitter (e.g., another vehicle) that transmitted the electromagnetic energy relative to the vehicle's position, which can then be factored as part of the navigation strategy.

The following detailed description may be used with one or more radar units having one or multiple antenna arrays. The one or multiple antenna arrays may take the form of a single-input single-output single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). A radar system may use one or more antennas that can focus radiated energy into tight beams to measure an environment with high accuracy. Such antennas may be compact (typically with rectangular form factors), efficient (i.e., with little of the 77 GHZ energy lost to heat in the antenna or reflected back into the transmitter electronics), low cost and easy to manufacture (i.e., radar systems with these antennas can be made in high volume).

Based on the shape and the materials of the corresponding waveguides, the distribution of propagating energy can vary at different locations within a radar unit, for example. The shape and the materials of the waveguides can define the boundary conditions for the electromagnetic energy. Boundary conditions are known conditions for the electromagnetic energy at the edges of the waveguides. For example, in a metallic waveguide, assuming the waveguide walls are nearly perfectly conducting (i.e., the waveguide walls can be approximated as perfect electric conductors-PECs), the boundary conditions specify that there is no tangentially (i.e., in the plane of the waveguide wall) directed electric field at any of the wall sides. Once the boundary conditions are known, Maxwell's Equations can be used to determine how electromagnetic energy propagates through the polarization-modification channels and waveguides.

Maxwell's Equations may define several modes of operation for any given polarization-modification channel or waveguide. Each mode has one specific way in which electromagnetic energy can propagate through the polarization-modification channel or waveguide. In addition, each mode has an associated cutoff frequency. A mode is not supported in a waveguide if the electromagnetic energy has a frequency that is below the cutoff frequency. By properly selecting both (i) dimensions and (ii) frequency of operation, electromagnetic energy may propagate through the waveguides in specific modes. The waveguides can be designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the respective polarization-modification channel or waveguide (e.g., assuming a rectangular waveguide). However, a suffix number of zero indicates that there is no variation of the field with respect to that direction. For example, a $TE_{10}$ mode indicates the polarization-modification channel or waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e., two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

Additionally or alternatively, different radar units using different polarizations may prevent interference during operation of the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example.

Some examples may involve using radar units having antenna arrays arranged in MIMO architecture. Particularly, the filter may be determined to adjust near-field measurements by a radar unit having antenna arrays arranged in MIMO architecture. Radar signals emitted by the transmission antennas are orthogonal to each other and can be received by one or multiple corresponding reception antennas. As such, the radar system or associated signal processor can perform 2D SAR image formation along with a 3D matched filter to estimate heights for pixels in a 2D SAR map formed based on the processed radar signals.

If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference. Additionally, a single vehicle may operate two radar units having orthogonal polarizations so that each radar unit does not interfere with the other radar unit.

Further, the configuration of a radar system can differ within examples. For instance, some radar systems may consist of radar units that are each configured with one or more antennas arrays. An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As a result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

To further illustrate, in some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., six transmission antenna arrays and three reception antenna arrays). In addition, some radar units may operate with parasitic arrays that can control radar transmissions. Other example radar units may include one or multiple driven arrays that have radiating elements connected to an energy source, which can have less overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array.

A radar unit may also include multiple types of arrays (e.g., a linear array on one portion and a planar array on another portion). As such, radar units configured with one or more antenna arrays can reduce the overall number of radar units a radar system may require to measure a surrounding environment. For example, a vehicle radar system may include radar units with antenna arrays that can be used to measure particular regions in an environment as desired while the vehicle navigates.

Some radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

The period of time during which a radar unit transmits a sequence of pulses (e.g., each with the same predetermined carrier frequency and predetermined pulse repetition frequency (PRF)) and then receives a corresponding return signal comprised of one or more pulses is referred to herein as a coherent processing interval (CPI). In some examples, all of the pulses of the sequence can be transmitted at the same angle, but in other examples, multiple groups of pulses can be transmitted at different angles. The length of a CPI can vary, and in one example can be selected to be a value in a range of 20-30 milliseconds (e.g., 25 milliseconds).

The vehicle radar system can process the return signal of each CPI (e.g., using digital signal processing). For example, the vehicle radar system can process the return signal for a given CPI to generate range-Doppler data (also known as a range-Doppler map or a range-Doppler matrix), which can include estimates of both range and velocity of potential targets and can thus be used for target detection and tracking. That is, range-Doppler data can take the form of arrays or other data structures that facilitate an evaluation of signal strength (or another parameter related to signal strength) as a function of target range and Doppler (e.g., velocity). In some examples, range-Doppler data can be represented in three-dimensions.

The range-Doppler data for various CPIs can be expressed as a series of signal strengths (or related parameters) corresponding to respective range-Doppler bins. For example, in processing a return signal for a given CPI to generate range-Doppler data, the vehicle radar system can sample, divide, and store the return signal into range bins. Each range bin can represent a segment of range values and have a corresponding signal strength. The data within each range bin may be processed (e.g., using Doppler filters) to generate Doppler bins corresponding to the range bin, where each Doppler bin corresponds to a signal from a target or other part of the environment at a given range moving at a given velocity. Thus, the resulting range-Doppler data for that CPI can be made up of a plurality of range-Doppler bins, each range-Doppler bin having a range bin index, a Doppler bin index, and a corresponding signal strength. The range-Doppler data can show the amplitude of returns from stationary targets (at zero Doppler) and moving targets (at nonzero Doppler) as a function of both range and velocity.

As an example, the range-Doppler data can include 400 range bins, each range bin having a corresponding 100 Doppler bins. Each range-Doppler bin can be represented by RD, where "R" is a range index value from 1 to 400 and "D" is a Doppler index value from 1 to 100 (e.g., $1_1, 1_2, \ldots 1_{100}, 2_1, 2_2, \ldots 2_{100}, \ldots 400_1, 400_2 \ldots 400_{100}$). In this example, each group of bins having the same range index (e.g., $1_1, 1_2 \ldots 1_{100}$) can be referred to as a "range slice" of the range-Doppler data and each group of bins having the same Doppler index (e.g., $1_{100}, 2_{100}, \ldots 400_{100}$) can be referred to as a "Doppler slice" of the range-Doppler data. Other examples are possible as well, as well as other example forms that range-Doppler data can take.

Furthermore, the vehicle radar system can similarly generate three dimensions of data—namely, range-Doppler-angle data—such as by using a series of Fast Fourier Transforms (FFTs). The range-Doppler-angle data can be filtered and binned using angle filters and measurements, and then indexed similarly to the range-Doppler data described above, albeit in three dimensions instead of two. In addition, range-Doppler-angle data can take the form of a range-Doppler-angle map, which can be a 3D image with range, Doppler, and angle coordinates/bins. In some cases, a bin of a range-Doppler-angle map can be referred to as a pixel of the map. Both range-Doppler data and range-Doppler-angle data can be used in performing the disclosed operations.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
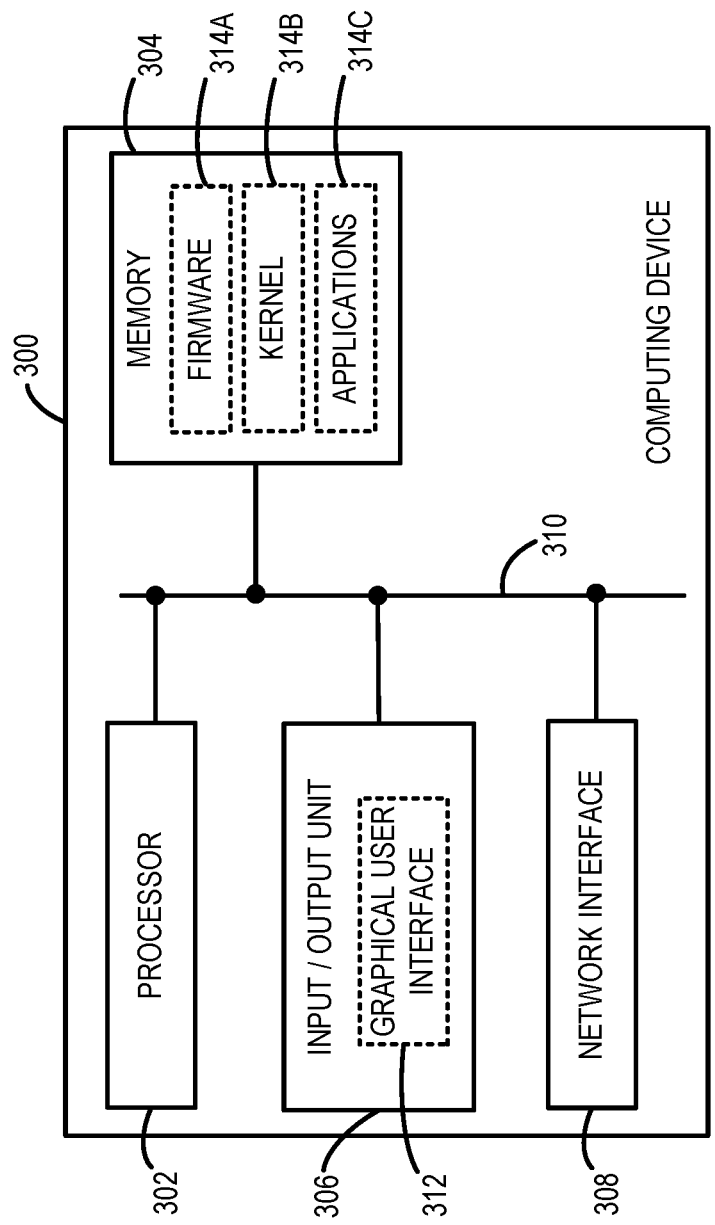
FIG. 3 is a simplified block diagram for a computing device, according to one or more example embodiments.

FIG. 3 is a simplified block diagram exemplifying a computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include machine learning software, examples of which can include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable on one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (WiFi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and WiFi interfaces. In some embodiments, network interface 308 may enable computing device 300 to connect with one or more vehicles to allow for remote assistance techniques for assisting vehicle operations such as interference detection or other processing performed at the vehicle 100.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

In addition, computing device 300 may enable the performance of embodiments described herein.

Figure 4:
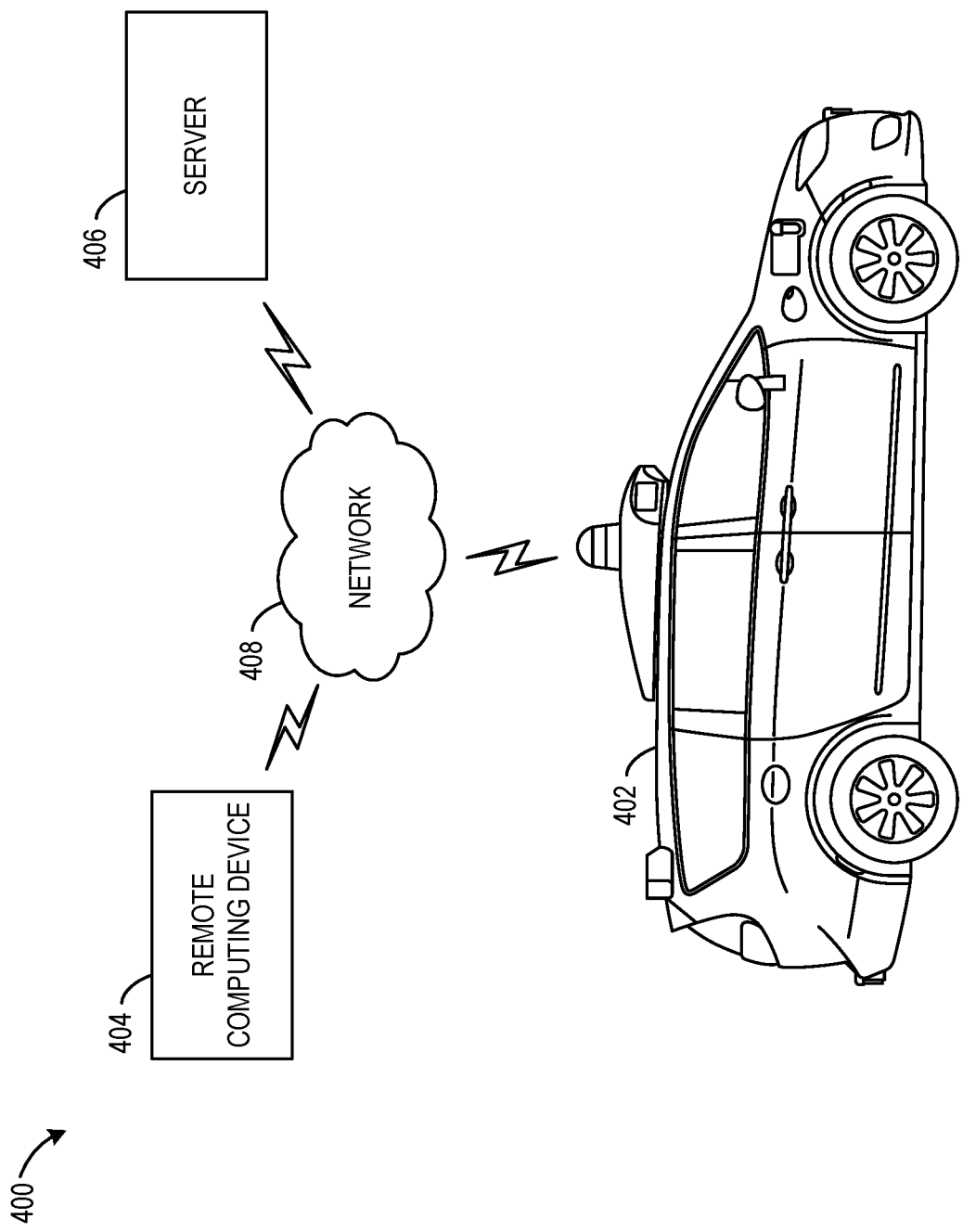
FIG. 4 is a system for wireless communication between a vehicle and computing devices, according to one or more example embodiments.

FIG. 4 is a system for wireless communication between computing devices and a vehicle, according to one or more example embodiments. Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may be configured to autonomously (or semi-autonomously) transport passengers or objects (e.g., cargo) between locations and may take the form of any one or more of the vehicles discussed above, including passenger vehicles, cargo shipping vehicles (e.g., trucks), farming and manufacturing vehicles, and dual-purpose vehicles. When operating in the autonomous mode, vehicle 402 may navigate and pick up and drop off passengers (or cargo) between desired destinations by relying on sensor measurements to understand the surrounding environment. In some embodiments, vehicle 402 can operate as part of a fleet, which may be managed by a central system (e.g., remote computing device 404 and/or other computing devices).

Remote computing device 404 may represent any type of device configured to perform operations, including but not limited to those described herein. The position of remote computing device 404 relative to vehicle 402 can vary within examples. For instance, remote computing device 404 may have a remote position from vehicle 402, such as operating inside a physical building. In some implementations, operations described herein that are performed by remote computing device 404 may be additionally or alternatively performed by vehicle 402 (i.e., by any system(s) or subsystem(s) of vehicle 402). Further, in some implementations, the remote computing device 404 can take a form that is the same as or similar to computing device 200 and can include one or more of the components of the computing device 200 illustrated in FIG. 3.

In addition, operations described herein can be performed by any of the components communicating via network 408. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device or devices configured to receive, store, determine, and/or send information relating to vehicle 402 and the remote assistance thereof. In some implementations, any of the one or more computing devices of server 406 can take a form that is the same as or similar to computing device 200 and can include one or more of the components of the computing device 200 illustrated in FIG. 3.

Server 406 may be configured to perform any operation(s), or portions of such operation(s), that is/are described herein as performed by remote computing device 404 and/or vehicle 402. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network. The various systems described above may perform various operations. These operations and related features will now be described.

Figure 5:
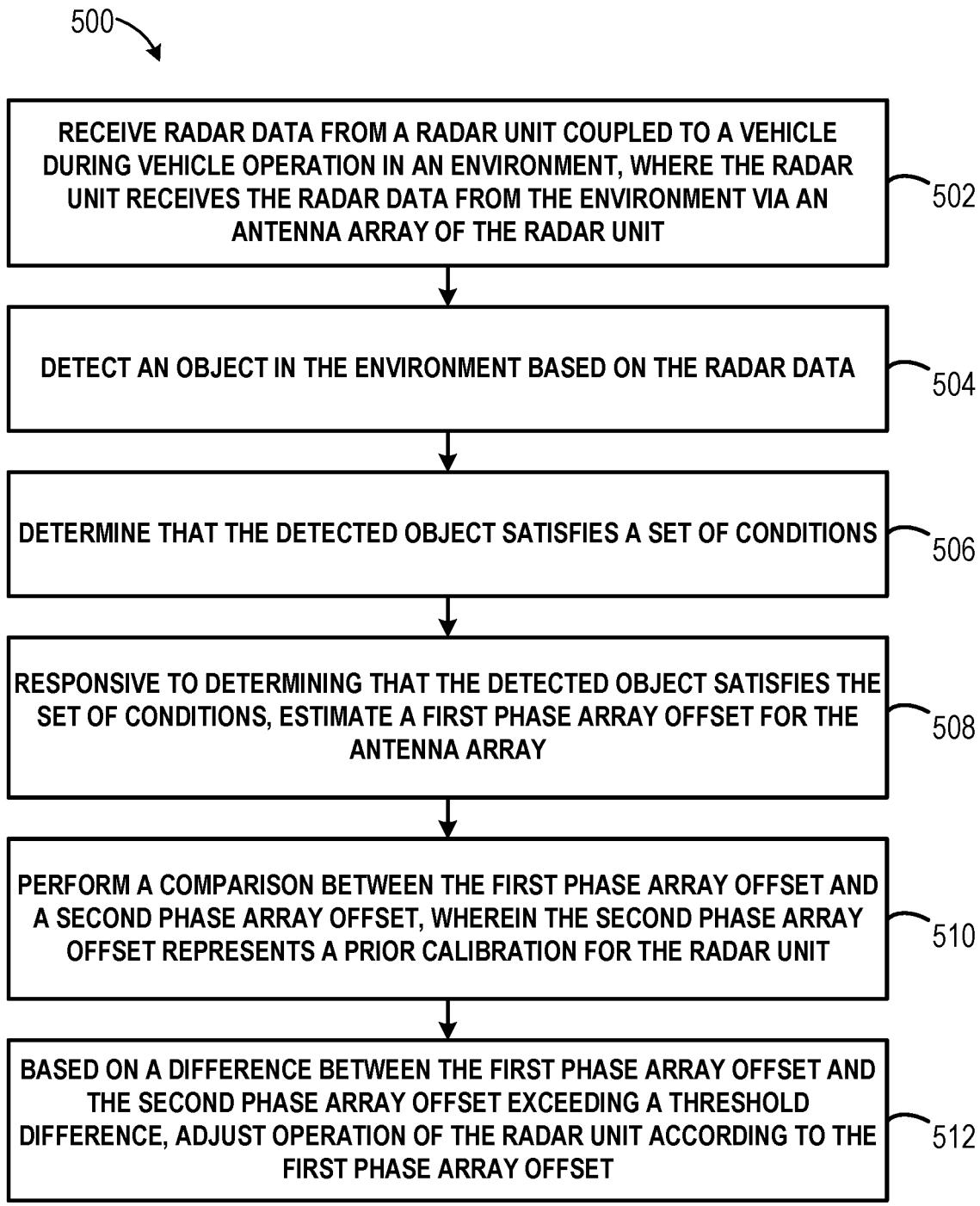
FIG. 5 is a flow chart of a method for antenna array calibration, according to example embodiments.

FIG. 5 is a flowchart of example method 500 for online antenna array calibration, according to an example embodiment. Method 500 may include one or more operations, functions, or actions, as depicted by one or more of blocks 502, 504, 506, 508, 510, and 512 each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

Method 500 can be performed in whole or in part by a computing device coupled to a vehicle, such as a device similar to or the same as computing device 300 described above. In some embodiments, the computing device can be located onboard the vehicle. In other embodiments, one or more operations of method 500 can be performed by a computing device that is remote from and wirelessly coupled to the vehicle (e.g., remote computing device 404 or server 406). For instance, a server can perform each of blocks 502-510, and adjust operation of the vehicle radar system by sending an instruction to a central control system of the vehicle that, upon receipt, causes the central control system to control the vehicle radar system to adjust its operation. In addition, some examples involve using multiple computing devices, such as a combination of computing devices and FPGAs associated with radar units.

At block 502, method 500 involves receiving radar data from a radar unit coupled to a vehicle during vehicle operation in an environment, where the radar unit receives the radar data from the environment via an antenna array of the radar unit. The antenna array may include multiple reception antennas that receive electromagnetic energy from the environment for subsequent processing. In some examples, the antenna array may include one or more uniform linear arrays (ULAs). Other types of arrays may also be used. In addition, the vehicle radar system may also use virtual antenna arrays corresponding to the radar unit to perform transmission and reception operations.

At block 504, the method 500 involves detecting an object in the environment based on the radar data. Object detection can involve detecting multiple objects in the environment across different radar returns.

At block 506, the method 500 involves determining that the detected object satisfies a set of conditions. Upon initial detection of a potential object, a FPGA or another device may filter the radar data to ensure that the detection corresponds to an object in the vehicle's environment. The set of conditions can be used to filter out object detections that are less useful for performing online calibration techniques. The set of conditions can be adjustable and predefined in some examples. In addition, the set of conditions can include one or more conditions that depend on the current environment of the vehicle.

The radar data can take various forms, such as peak data that the computing device receives from firmware located onboard or remote from the vehicle, by way of example. For example, the peak data can be received from a FPGA with firmware designed to perform one or more processes, such as motion compensation, beamforming, peak detection, and image formation. As such, a computing device can receive data from one or more multiple FPGAs operating within a vehicle radar system. For instance, each FPGA may correspond to a particular radar unit and can be configured with firmware for range/Doppler processing and/or range/azimuth processing and software for waveform sequencing.

Radar data can include peaks sampled from returns across a variety of CPIs and from multiple angles of arrival. The peak data can be or include a peak list and corresponding waveform data for each CPI associated with the peak list, in some cases. For example, upon the vehicle radar system's detection of return signals from the vehicle's environment, the return signals can be processed in various ways (including but not limited to processing to generate the range-Doppler data or range-Doppler-angle data as discussed above), and peaks in the return spectra can be identified and arranged into a peak list. The peak list can take various forms and can include, for instance, multiple peak values (e.g., amplitudes) and corresponding ranges, Doppler values, and angles. That is, the peak list can include the range-Doppler-angle coordinates/bins for each peak. Further, the radar data that is received can also include waveform parameters for each CPI with which the peaks of the peak list are associated. Such parameters can include a center frequency and a bandwidth, for instance.

Using the radar data, the computing device can detect portions of radar data that represent one or more objects and satisfy one or more conditions, such as exceeding a particular SNR ratio, having a location that is at least a threshold range from the vehicle and/or a certain Doppler score (e.g., zero Doppler). For instance, the computing device can refer to the peak data and identify a set of one or more peaks with each peak representing a different object in the environment above a threshold confidence (e.g., a first peak representing a first car, a second peak representing a second car, a third peak representing a street sign, etc.).

The condition or set of conditions used to identify the set of peaks can include, for example, a first condition that the set of peaks in the training data exceeds a signal-to-noise ratio (SNR) threshold, since a higher SNR for a peak can indicate a higher probability that the peak is from a single target object from the environment, such as a car, truck, street sign, or another large and/or metallic object. The SNR threshold can be a value selected from a range of 10-30 dB, inclusive, by way of example, such as 20 dB.

Other conditions can be used as well, additionally or alternative to SNR. For example, the set of conditions can include a second condition that the target objects represented by the set of peaks are located at a range that exceeds a range threshold and/or a third condition that the set of peaks represent a Doppler that is within a predefined Doppler range. In some examples, the range threshold can be a value selected from a range of 15-30 meters, inclusive, by way of example, such as 20 meters. Different ranges can be used in other examples. The predefined Doppler range can be 0) to 1000 Hz, inclusive, by way of example. In some cases, the computing device can select only zero Doppler peaks. In other cases, the computing device can ignore peaks at zero Doppler. As another example, the set of conditions can include a fourth condition that the set of peaks are within a predefined azimuth range. The predefined azimuth range can be −60 degrees to 60 degrees, inclusive, by way of example.

In contrast to a calibration chamber, it can be more difficult in a vehicle's driving environment to know when a peak corresponds to a single target object. Thus, the present disclosure involves identifying the set of peaks from multiple data samples over multiple CPIs and multiple angles of arrival, so that target objects can more easily be picked out of noise and, in turn, so that the noise can be isolated from the target objects. In some cases, the set of peaks can include peaks that correspond to the same object at different times.

In some examples, for each identified peak in the set of peaks, the computing device can create a mask on all other range bins and on all other Doppler filters centered about that peak if the peak is the largest peak within a particular range or Doppler slice (and above the SNR threshold discussed above). That is, the created mask can help eliminate the possibility of using any other, smaller peaks with the same range coordinate (but a different Doppler coordinate) and/or with the same Doppler coordinate (but a different range coordinate) of the largest peak, so that for a given range slice or Doppler slice, the largest peak is used. As such, the quality of training samples for use with the disclosed techniques can be used—namely, training samples that each represent only one target.

After creating the mask as discussed above, then, for each of the remaining peaks in the set of peaks, the computing device can (i) use an estimated azimuth angle to determine an azimuth bin index (also referred to herein as "angle bin," for brevity) in which to store the peak, and (ii) discard the peak if a threshold amount of peaks has already been identified or if the peak is masked out. Storing the peaks in the angle bins can help ensure a wide diversity for spatially invariant error estimation and to estimate the spatial error for each individual direction (i.e., to estimate the spatially variant error).

One the set of peaks have been identified, the computing device can retrieve training data representing the identified set of peaks. The training data corresponds to multiple channels of the vehicle radar system (e.g., 16 receiver channels across 4 time divisions (or, 64 virtual channels)). The training data can be or include training data from multiple CPIs, center frequencies, and/or angles. The training data can take the form of range-Doppler data in some examples, or can take other forms in other examples. For instance, azimuth (e.g., range-azimuth data) and/or elevation information may also be used. In some examples, the computing device can obtain the channel data from the FPGA associated with a radar unit that captured the identified set of peaks.

In some examples, to facilitate retrieval of the training data, the identified set of peaks representing objects in the vehicle's environment can take the form of a list of identified peaks, such as a subset of the peaks included in the peak data discussed above, as well as a corresponding data such as CPI identification number, center frequency, range bin index, Doppler bin index, angle bin index, etc. for each identified peak. Using the list of identified peaks and associated data, the computing device can then retrieve, from firmware (e.g., the firmware noted above), range-Doppler data or range-Doppler-angle data that has been computed and stored in memory within a recent window of time (e.g., in the last X minutes or hours, where X is an integer greater than zero). That is, the computing device can retrieve range-Doppler data or range-Doppler-angle corresponding to the list of identified peaks and associated identified CPIs, center frequencies, etc., while that historical range-Doppler data is still available for retrieval for those CPIs. The recent window of time can be 15 minutes, for example.

In some examples, the computing device can identify peaks that likely represent reflective objects in the environment and retrieve corresponding training data for up to a predefined number of center frequencies and CPIs simultaneously. For instance, the computing device can collect between 400 and 800 peaks per center frequency and CPI.

For each peak that is retrieved, the computing device can determine which angle bin that peak's corresponding range-Doppler data belongs to and can update the number of peaks in the angle bin. To facilitate this, the computing device can divide the radar system's field of view into angle bins and map the angle provided in the peak list to one of those angle bins. For instance, the range of −60 to +60 degrees could be divided into 1 degree angle bins and the computing device can be configured to determine a certain number of peaks per angle bin. To improve the quality of, and to reduce bias in, the training data for use in online calibration, it can be desirable for the training data to have a large variety of peaks across a large variety of angles.

In some examples, the computing device can be configured to complete the identification of the set of peaks and the retrieval of the training data used for online calibration of one or more radar units in around 20-25 milliseconds (e.g., at or near one CPI's worth of time).

In some examples, the computing device can be configured to further refine the list of identified peaks by applying one or more filtering techniques, so as to remove outliers such as sidelobe peaks and/or extraneous peaks at certain angles, which can help improve the training data. For example, the computing device can remove, from the list of identified peaks (or from a sub-list of identified peaks corresponding to certain predefined angles), any peak that falls below a predefined refined SNR threshold, where the predefined refined SNR threshold is selected based on a SNR that is expected for undesired sidelobes. As another example, the training data can be filtered to remove statistical outliers based on the power or amplitude per entry. For instance, considering power values at each virtual channel (e.g., 1 through 64), the computing device can identify and remove portions of the training data that exceed a standard deviation relative to the entire training data. As yet another example, training data can be filtered to remove statistical outliers based on the phase per steering vector entry (channel). For instance, the computing device can form an angle spectrum of the training data. Considering phase values at each virtual channel, the computing device can identify and remove portions of the training data that have angle spectrums that are outliers relative to the majority of the training data. As a more specific example, if there are 100 training samples and 99 of 100 of the angle spectrums of the training samples appear like normal sinc functions, whereas one of the angle spectrums has extra humps or other features that are unlike the other 99, this can be indicative of multiple targets and is thus most likely not a desirable training sample. Accordingly, the computing device can remove the one angle spectrum.

At block 508, method 500 involves estimating a first phase array offset for the antenna array responsive to determining that the detected object satisfies the set of conditions. The first phase array offset can take the form of one or more phase calibration coefficients, hereinafter referred to as "calibration coefficients."

To facilitate this, the computing device can perform a smoothing process to each peak of the identified set of peaks. The smoothing process can include one or more of a phase calibration, a motion compensation, and a linear phase compensation. The computing device can then extract, from the training data, error data that represents portions of the training data that differ from the identified set of peaks. The act of extracting the error data from the training data can involve one or more operations that remove the portions of the training data that correspond to the target objects, thus leaving the error for the computing device to then measure. Phrased another way, the extracting process can be used to put the training data in a form that can be used to estimate the spatially invariant errors and spatially variant errors. Both the input and the output to the extracting process can be a vector of complex data samples (e.g., 64 complex data samples), one for each virtual channel. Hereinafter, the error data can alternatively be referred to as the "conditioned training data."

Error data can include phase error data (e.g., phase noise, and in some examples can further include other errors such as amplitude error. For a given target object in some scenarios, the return power might be expected to be the same across all channels, but radar system hardware can cause differences in gain from channel to channel. This difference is referred to as amplitude error herein. When the computing device calculates the spatially invariant error as described in more detail herein (which also estimates phase error), the computing device also estimates the amplitude error.

In some examples, a phase calibration, a motion compensation, and/or a linear phase compensation can be applied to each peak across all virtual channels (e.g., 64 channels, when there are 16 receiver channels across 4 time divisions) based on the angle bin/direction that the peak came from. For example, the phase calibration can be performed first, followed by the motion compensation, followed by the linear phase compensation.

To perform phase calibration on a peak, the computing device can use any existing phase calibration technique, for instance. To obtain the appropriate phase calibration coefficients for the peak, the computing device can select one of a plurality of phase calibration coefficients based on the center frequency and CPI identifier associated with the peak. In the context of extracting error data, the act of phase calibration can involve applying the initial offline calibrations (e.g., one or more of the above-noted plurality of phase calibration coefficients) that have been generated offline using chamber measurements.

Motion compensation can then be performed using multichannel data (e.g., data gathered using multiple transmit and receive channels in a time division multiple access MIMO scheme) to estimate the motion of the targets represented by the identified set of peaks. To perform motion compensation, the computing device can use any existing motion compensation technique, for instance, such as MIMO motion compensation. In an example in the context of MIMO, the computing device can perform motion compensation to the last 4 of 5 time divisions for each peak, but not to the first time division of each peak. With other radar architectures, motion composition could be performed using other techniques applicable to those architectures.

To perform linear phase compensation, the computing device may first map the receive channels (e.g., 16 receiver channels) and time divisions (e.g., 5 time divisions) into a number of virtual channels (e.g., 64 virtual channels). Then, the computing device can compute the azimuth angle and linear phase compensation weights for each peak. To facilitate this for a given peak, the computing device can obtain the range, Doppler, and azimuth index of the peak, compute the angle in which the peak came from, and compute the linear phase compensation weights to remove the peak from the training data. The computing device can then normalize the training data.

Performing linear phase compensation on a peak can remove the linear phase corresponding to the peak's angle such that the peak's angle is at 0 azimuth beam.

As an example, the computing device can use the azimuth angle of the peak reported from a moving target indicator (MTI). In this context, an MTI can be a list or container for the peaks—namely, a list or container where peak data and parameters are stored. Calculating the linear phase compensation is then represented by Equation 1, where $\theta_p$ is the azimuth angle of the peak, ch is the channel number (e.g., 0, 1, . . . 63), and elloc_wavelength (ch) is the virtual element location in units of wavelength. The output, w (ch) is then a vector of weights, where each weight adjusts the phase of each virtual channel such that the peak (representing the target object) is removed for that channel including the error/phase weights for each virtual channel.

$$w(ch)=\exp(j2\pi*\text{elloc\_wavelength}(ch)*\sin(\theta_p)) \quad \text{(Equation 1)}$$

As another example, the computing device can detrend the phase across the virtual channels. That is, the computing device can compute the linear phase slope across some of the virtual channels (e.g., 61 of the 64 virtual channels) and then remove the linear phase slope from the range-Doppler data.

For instance, this process can be represented by Equations 2, 3, 4, 5, and 6 below.

$$\phi_x=\text{unwrap}(\text{angle}(X_{MIMO})) \quad \text{(Equation 2)}$$

$$\text{Cov}_{\phi_x}\nu^T V\text{-}61*V*\overline{\phi_x} \quad \text{(Equation 3)}$$

$$\text{Var}_\nu=V^T V\text{-}61*\overline{V^2} \quad \text{(Equation 4)}$$

$$\phi_{slope}=\text{Cov}_{\phi_x}\nu/\text{Var}_\nu \quad \text{(Equation 5)}$$

$$w(ch)=\exp(-j*n(ch)*\phi_{slope}) \quad \text{(Equation 6)}$$

In Equation 2, $X_{MIMO}$ can be the number of virtual channels of the peak at a particular range/Doppler (e.g., in this case, 61 virtual channels). The unwrapped phase of this data can be represented by Equation 2. Equations 3-5 can then be used to compute the phase slope, $\phi_{slope}$, with a least squares fit. After the phase slope is computed, the phase weights for each virtual channel, w(ch), can be computed to remove the linear phase component. In Equations 3-6, V is a vector of virtual channel indices (e.g., V=[0, 1, 2, . . . 60]), ch is the channel number (e.g., 0, 1, . . . 63), and n= [0, 1, . . . , 15, 15, 16, . . . , 30, 30, 31, . . . , 44, 45, 46, . . . 60]. More particularly, n in this example is a vector that is 64 in length and is numbered from 0] to 60 m but repeats index 15, 30, and 45 twice, which represents how, when a MIMO array is formed, there is overlap with channels 15, 30, and 45 overlap.

Having extracted the error data, the computing device can estimate the first phase array offset based on the extracted error data. To facilitate this, the computing device can calculate a spatially invariant correction and a spatially variant correction of the error data, and then estimate a phase array offset based on the determined spatially invariant correction and the determined spatially variant correction. The spatially invariant correction represents an estimated error across the plurality of angle (directions) observed by the radar unit. The spatially variant correction thus represents an estimated error per angle (direction—that is, an estimated error unique to each angle (direction) observed by the radar unit.

In some cases, the computing device might first check to determine whether enough training data has been collected across all angle bins (e.g., more than a threshold amount error data for peaks per bin). If so, the computing device can calculate the spatially invariant correction and the spatially variant correction of all the error data.

In some examples, the computing device can calculate the spatially invariant correction of the error data by performing singular value decomposition (SVD) to help obtain the eigenvector corresponding to the largest eigenvalue, and then computing the spatially invariant correction.

As an example, this SVD process can be represented by Equations 7, 8, 9, 10, 11, 12, 13, 14, 15, and 16 below; particularly in a situation with 64 virtual channels as with the examples provided above.

$$\text{tmpPhsErr}=\text{unwrap}(\text{angle}(U\_max)) \quad \text{(Equation 7)}$$

$$\text{covVPhsErr}=V[0]*\text{tmpPhsErr}[0]+V[1]*\text{tmpPhsErr}[1]+ \ldots +V[63]*\text{tmpPhsErr}63]64*\text{mean}(V)*\text{mean (tmpPhsErr)} \quad \text{(Equation 8)}$$

$$\text{varV}=V[0]^2++V[1]^2+ \ldots +V[63]^2-64*(\text{mean}(V)^2 \quad \text{(Equation 9)}$$

$$\text{phsSlope}=\text{covVPhsErr}/\text{varV} \quad \text{(Equation 10)}$$

$$w[v]=\exp(-j*\text{VMIMOChanNum}[v]*\text{phsSlope}) \quad \text{(Equation 11)}$$

$$U\_max\_shift\ [v]=w[v]*U\_max\ [v] \quad \text{(Equation 12)}$$

$$\text{amp\_err}[v]=|U\_max\_shift[v]|/\text{mean}(|U\_max\_shift|) \quad \text{(Equation 13)}$$

$$\text{phase\_err}[v]=\text{angle}\ (U\_max\_shift\ [v]) \quad \text{(Equation 14)}$$

$$\text{err}[v]=\text{amp\_err}[v]*\exp\ (j*\text{phase\_err}[v]) \quad \text{(Equation 15)}$$

$$si\_\text{corr}[v][rf\_idx]=1/\text{err}[v] \quad \text{(Equation 16)}$$

Singular value decomposition can be used to compute eigenvectors on a matrix of training data that is sized num_virtual_channels×num_training samples (e.g., 64×600). The eigenvector corresponding to the largest eigenvalue, U_max, can represent the spatially invariant error. As with the present example, the eigenvector can be a complex vector of 64 virtual channels (or another quantity of virtual channels in other examples). The computing device can use Equations 7-12 to remove residual linear phase from the eigenvector, U_max, since such residual linear phase can be undesirable. Specifically, Equations 11-12 are used to compute the weights to remove the residual linear phase. With respect to Equations 8-9, V can be [0, 1, . . . , 63] and represent a vector of indexing for the virtual channels. In some examples, once the residual linear phase is removed, the computing device can use Equations 13-15 to compute the spatially invariant error vector by computing normalized amplitude (Equation 13) and normalized phase (Equation 14) of each channel. The normalized amplitude and phase can then be combined (Equation 15), which results in the estimate of the spatially invariant error. The computing device can then take the reciprocal of the spatially invariant error, as shown in Equation 16, to generate the spatially invariant error correction needed to remove the error.

As shown above, some of the equations used with SVD can be similar to the equations used for phase compensation. In both situations, the computing device can remove linear phase across the channels, but the processes are different in that phase compensation involves removing the peak corresponding to the target object, whereas SVD removes any remaining residual linear phase from the phase compensation process. It can be desirable to remove this remaining residual linear phase since leaving it might induce a bias on the calibration.

In some examples, the computing device can use the Rayleigh Power Method to help obtain the eigenvector corresponding to the largest eigenvalue, U_max, for use with the SVD process described above.

As an example, the Rayleigh Power Method can be represented by Equations 17, 18, 19, 20, 21, 22, followed by the iterative algorithm (i.e., a while loop) that follows Equation 22 below, and then followed by Equation 23. In particular, the Rayleigh Power Method includes two configurable parameters, represented by Equations 17 and 18, to help balance between accuracy, Tol, and time, nmax_iter (i.e., the maximum number of times the algorithm will iterate). Equations 19-22 can be used to initialize the iterative algorithm with the covariance matrix and an initial guess to what the eigenvector is. In an example with 64 virtual channels, x0 can be the initial guess of the eigenvector, where x0 [0]=1, x0 [1]=0, x0 [2]=0, x0 [3]=0, . . . , x [62]=0, and x0 [63]=0.

Inside the while loop, (i) the Rayleigh quotient is calculated, (ii) the eigenvalue lambda is approximated, and then the error between the calculated eigenvector, z, and the previous guess to the eigenvector, x, is estimated, (iii) a new guess to the eigenvector, x, is then calculated, and (iv) the algorithm continues to iterate. If the resulting error is less than the tolerance, then the eigenvector, x, is found and set to U_max, as indicated by Equation 23. If the number of iterations exceeds nmax_iter, the algorithm also stops and outputs the last calculated eigenvector and sets that eigenvector to U_max. Otherwise, the algorithm can continue to iterate.

$$Tol=0.001 \quad \text{(Equation 17)}$$

$$n\text{max\_iter}=10 \quad \text{(Equation 18)}$$

$$\text{CovA}[m][n]=\text{peak\_train\_data}[m][\mathit{fp}=0]*\text{conj}(\text{peak\_train\_data}[n][\mathit{fp}=0])+ \ldots +\text{peak\_train\_data}[m][\mathit{fp}=\text{nTrainPeaksAll}-1]*\text{conj}(\text{peak\_train\_data}[n][\mathit{fp}=\text{nTrainPeaksAll}-1])) \quad \text{(Equation 19)}$$

$$err=Tol+1 \quad \text{(Equation 20)}$$

$$iter=0 \quad \text{(Equation 21)}$$

$$X=x0 \quad \text{(Equation 22)}$$

while err (end)>=tol && iter<=nmax_iter
z=CovA*x:
lambda=norm (z):
tmpErr=norm (z−lambda*x);
err=[err: tmpErr]:
x=z/norm (z): % New Eigenvector
iter=iter+1:

$$U\_\text{max}=x \quad \text{(Equation 23)}$$

In either of the examples indicated above, the reciprocal of the maximum eigenvector can be used as the spatially invariant correction of the error data. Phrased another way, a calibration vector representing the spatially invariant correction can be the reciprocal of the error estimate from the error data.

Once the spatially invariant correction has been calculated, the computing device can calculate the spatially variant correction. In particular, the computing device can remove the spatially invariant error from the training data and then sort the residual errors over multiple CPIs by direction. Then, for each direction grouping of training data, the computing device can again perform SVD, which results in the estimation of the spatially variant correction.

At block 510, method 500 involves performing a comparison between the first phase array offset and a second phase array offset, where the second phase array offset represents a prior calibration for the radar unit. The computing device can assess the second phase array offset representing the existing/prior calibration to determine whether the second phase array offset should be updated using the first phase array offset or rather to wait until a later time to update. In some situations, the second phase offset can be based on an offline calibration process, such as a calibration of the vehicle radar system that occurred before the vehicle was placed into operation. In other situations, the second phase offset can be based on a previous calibration performed by way of method 500.

In some examples, the comparison may involve comparing the results obtained using the different offsets. For instance, a FPGA or another computing device can compare the sidelobe levels associated with signal transmission and reception when the antenna array was controlled based on the existing phase offset and the sidelobe levels associated with antenna array operation based on the newly determined phase offset. As an example result, the decision to update calibration data to adjust phase offset can occur after a test transition using the newly determined phase offset. In some cases, the computing device may keep the prior phase array offset after failing to generate calibration adjustments that increase performance of the radar unit.

At block 512, method 500 involves adjusting operation of the radar unit according to the first phase array offset based on a difference between the first phase array offset and the second phase array offset exceeding a threshold difference. The operation of the radar unit can be adjusted based on the determined spatially invariant correction and the determined spatially variant correction, for instance. If the difference between the first phase array offset and the second array offset is less than the threshold difference, however, the radar unit can be operated according to the second phase array offset.

In some examples, adjusting operation of the radar unit according to the first phase array offset can involve updating a phase calibration table having a plurality of calibration coefficients corresponding to the channels and representing a prior calibration for the radar unit, and then controlling the radar unit to acquire radar data from the environment of the vehicle using the updated phase calibration table. To update the phase calibration table, for example, the diagonal entries of an existing phase calibration matrix stored in memory can be multiplied by the spatially invariant correction.

In an example where the computing device is not onboard the vehicle itself, the act of adjusting operation of the radar unit can involve transmitting, to the vehicle radar system or a central computing system of the vehicle, the updated phase calibration table, whereupon receipt of the updated phase calibration table, the vehicle radar system can then use (or the central computing system can control the vehicle radar system to use) the updated phase calibration table for subsequent acquisition of radar data.

As a general matter, the conditioned training data—that is, the error data extracted from the training data—can already have the phase calibration applied, so those determined spatially invariant correction and the determined spatially variant correction can be used directly to compute metrics for assessing whether a calibration update is needed. For instance, if the current calibration performance meets certain conditions, the existing calibration coefficients may be left unchanged until a later time, and if the current calibration performance does not meet certain conditions, the existing calibration coefficients may be updated.

As a more specific example, consider a "calibration collection interval," which is defined as the period of time the computing device takes to collect the training data and compute the spatially invariant correction and the spatially variant correction. After the training data is collected and the spatially invariant and spatially variant corrections are computed as described above, the performance is assessed with the existing calibration coefficients. If the computing device determines that the existing calibration coefficients do not meet certain conditions relative to the newly-determined calibration coefficients, the determined spatially invariant and spatially variant corrections are used to update the existing calibration coefficients, and the updated calibration coefficients are then updated at the next calibration collection interval. If the computing device determines that the existing calibration coefficients meet certain conditions relative to the new calibration coefficients (e.g., the first phase array offset), the determined spatially invariant and spatially variant corrections are not used to update the existing calibration coefficients and the calibration performance of the existing calibration coefficients can be evaluated again at the next calibration collection interval.

To facilitate the comparison of the calibration performance of the existing calibration coefficients with the potential calibration performance of the new calibration coefficients determined from the determined spatially invariant correction and the determined spatially variant correction discussed above, the computing device can apply the determined spatially invariant and spatially variant corrections (that is, the new spatially invariant and spatially variant corrections) to the error data to generate first calibration data associated with the first phase array offset. The computing device can also retrieve, from memory, past spatially invariant and spatially variant corrections from the previous calibration correction interval or from another point in time, and apply the past spatially invariant and spatially variant correction to the error data to generate second calibration data associated with the second phase array offset. The computing device can then perform a comparison technique, examples of which are described below.

In one example, the computing device can determine and then compare a first entropy value and a second entropy value associated with the first and second calibration data, respectively. To facilitate this, the computing device can, in sequential order for the first calibration data, (i) get rid of overlapped virtual channels from the error data, (ii) compute the power of the azimuth spectrum for each peak by applying an inverse Fast Fourier Transform (IFFT) (e.g., a 512 point IFFT), (iii) compute power and normalized such that total power equals one, (iv) compute one-dimensional image entropy for each peak, and (v) compute median entropy across all peaks. The computing device can then perform the same operations for the second calibration data and compare the results with those of the first calibration data. For example, if, from the second calibration data results to the first calibration data results, the median entropy rises above a particular entropy threshold (e.g., 3.1 Entropy), the computing device can responsively update the existing calibration coefficients using the determined spatially invariant correction and the determined spatially variant correction. Whereas, if the median entropy does not rise above the particular entropy threshold, the computing device can responsively continue to use the existing calibration coefficients for another calibration collection interval. In some implementations, the computing device can additionally or alternatively compare the entropy of the first calibration data to each of a plurality of entropies determined as described above and associated with a plurality of past spatially invariant and spatially variant corrections (e.g., a sliding window of past spatially invariant and spatially variant corrections). Other examples are possible as well.

In another example, the computing device can determine and compare the peak sidelobe levels and the RMS sidelobe levels of the first and second calibration data. To facilitate this, based on the spatially invariant and spatially variant corrections, the computing device can, for the first calibration data, (i) generate an array impulse response and (ii) based on the array impulse response, calculate peak sidelobe level (i.e., the maximum power value excluding the mainlobe region) and RMS sidelobe level metrics (i.e., the square root of the arithmetic mean of the power value: RMS=sqrt $(1/N*(A+B+C+ \ldots ))$.

More particularly, the computing device can get rid of overlapped virtual channels from the error data, compute the power of the azimuth spectrum for each peak by applying an IFFT (e.g., a 512 point IFFT), compute power and normalize to the peak of the power spectral density, compute median azimuth spectrum power over the set of identified peaks, and then compute the peak sidelobe level and the RMS sidelobe level from the median azimuth spectrum power. The media azimuth spectrum power can be used to measure and evaluate the array impulse response.

The computing device can then perform the same operations for the second calibration data and compare the results with those of the first calibration data. That is, the computing device can compare the calculated peak sidelobe level and RMS sidelobe level metrics associated with the first phase array offset to existing peak sidelobe level and RMS sidelobe level metrics associated with the second phase array offset and currently in use by the vehicle radar system in accordance with the existing calibration coefficients. Based on the comparison, the computing device can then decide whether to update the existing calibration coefficients. For instance, if, from the second calibration data to the first calibration data, the peak sidelobe level has degraded more than a first threshold (e.g., −25 dB) and the calculated RMS sidelobe level has degraded more than a second threshold (e.g., −30 RMS sidelobe level), the computing device can responsively update the existing calibration coefficients using the determined spatially invariant correction and the determined spatially variant correction.

In other implementations, the computing device can also be configured to update the current calibration coefficients if they have not been updated in over a predetermined period of time (e.g., in over an hour).

As a result of method 500, the antenna array peak sidelobe level of the radar unit can reach a desirable level, such as −35 dBc.

Figure 6:
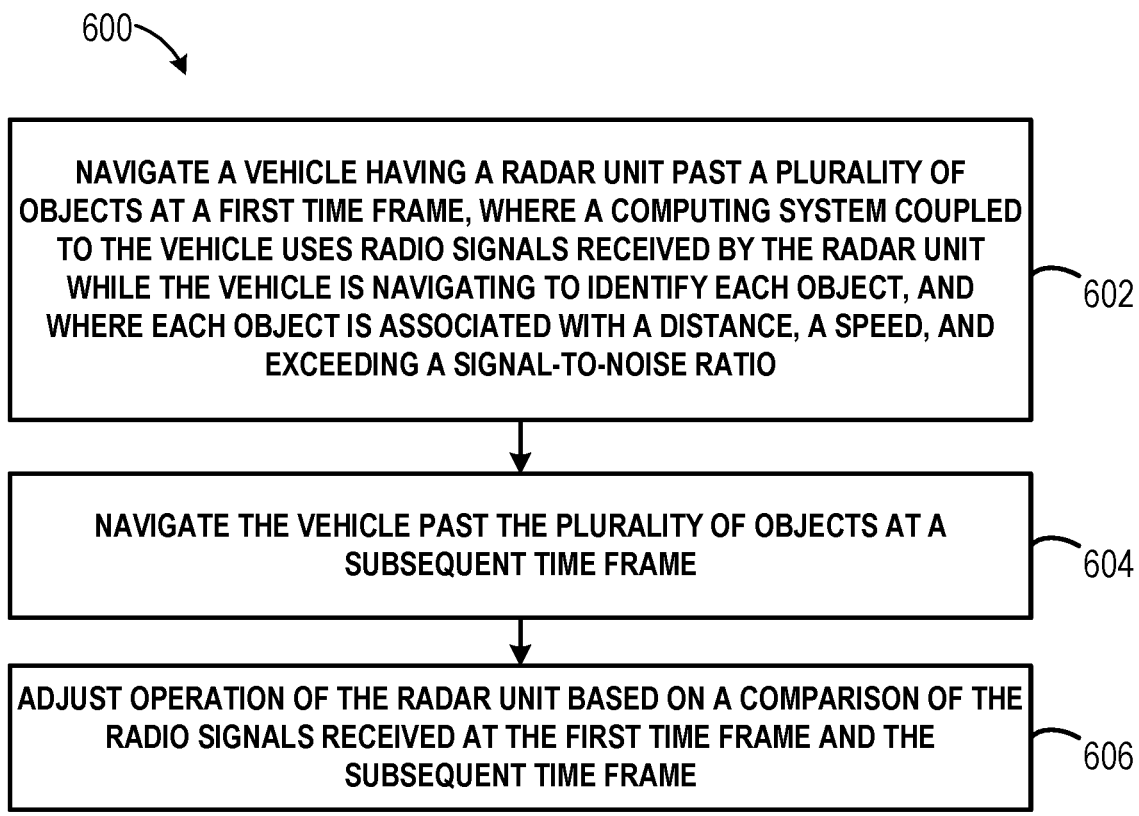
FIG. 6 is a flow chart of another method for antenna array calibration, according to example embodiments.

FIG. 6 is a flowchart of an example method 600, according to an example embodiment. In particular, method 600 is a method for using a software model trained with the interferer dataset described above in order to differentiate desired radar reflections from interference produced by other emitters, and then to use the desired radar reflections to generate a representation of the vehicle's environment. Method 600 may include one or more operations, functions, or actions, as depicted by one or more of blocks 602, 604, and 606, each of which may be carried out by any of the systems shown in prior figures, among other possible systems.

Method 600 can be performed in whole or in part by a computing device coupled to a vehicle, such as a device similar to or the same as computing device 300 described above. In some embodiments, the computing device can be onboard the vehicle. In other embodiments, one or more operations of method 600 can be performed by a computing device that is remote from and wirelessly coupled to the vehicle (e.g., remote computing device 404 or server 406). For instance, a server can perform each of blocks 602-606, and adjust operation of the vehicle radar system by sending an instruction to a central control system of the vehicle that, upon receipt, causes the central control system to control the vehicle radar system to adjust its operation.

At block 602, method 600 involves navigating a vehicle having a radar unit past a plurality of objects at a first time frame. A computing system coupled to the vehicle (e.g., computing device 300) can use radio signals received by the radar unit while the vehicle is navigating to identify each object, such as in the manner described above with respect to method 500. As such, and as discussed above, each object is associated with a distance, a speed, and exceeding a signal-to-noise ratio. As further discussed above, the plurality of objects can include one or more cars, one or more trucks, one or more street signs, and/or one or more metallic objects having a size equal to a car or larger. The size threshold can be adjusted in some examples. For instance, threshold can also involve other specific conditions, such as a predefined range and Doppler. The first time frame can be a particular day, time of day (e.g., daytime, twilight, night time), hour of the day, minute of the day, etc.

The identification of the plurality of objects can be used to generate a phase array offset for calibrating the radar unit, such as the second phase array offset described above. The vehicle can then be navigated past the plurality of objects again to generate a new phase array offset for calibrating the radar unit, such as the first phase array offset described above.

As such, at block 604, method 600 involves navigating the vehicle past the plurality of objects at a subsequent time frame. The subsequent time frame can be a subsequent day, time of day, hour of the day, minute of the day, etc. For example, the vehicle can be navigated past the plurality of objects at 6:00 am on a Monday, and the vehicle can be subsequently navigated past the plurality of objects at 6:00 am the next day (i.e., Tuesday). By navigating the vehicle past the plurality of objects at the subsequent time frame, radio signals received by the radar unit while the vehicle is navigating are used by the computing system to identify each object.

At block 606, method 600 involves adjusting operation of the radar unit based on a comparison of the radio signals received at the first time frame and the subsequent time frame. The comparison and the adjustment can occur in the manner described above at blocks 510 and 512 of method 500, for instance.

In some examples, a vehicle radar system may report calibration data updates to a central system. For instance, the vehicle radar system may provide an indication when adjustment of an individual radar unit exceeds a threshold amount of change. In some instances, the vehicle radar system can also iteratively perform an online calibration process to maintain operation of individual radar units above a threshold performance level.

Figure 7:
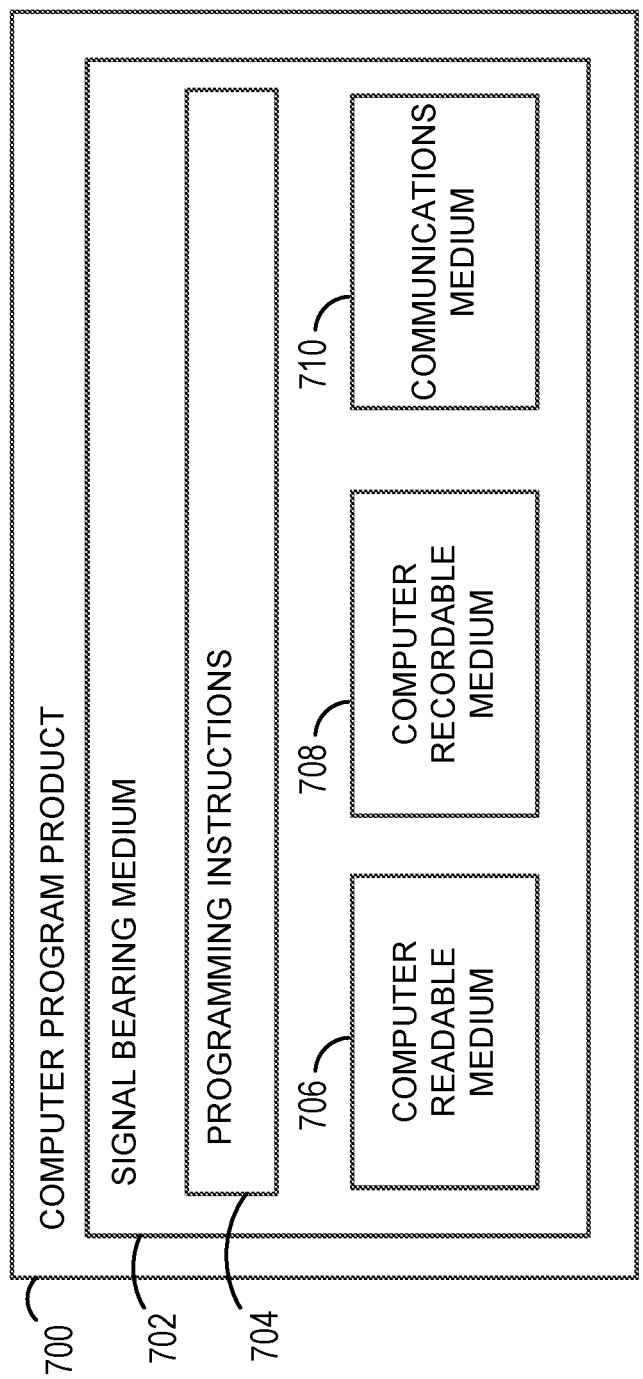
FIG. 7 is a schematic diagram of a computer program, according to example implementations.

FIG. 7 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 700 is provided using signal bearing medium 702, which may include one or more programming instructions 704 that, when executed by one or more processors may provide functionality or portions of the functionality described above with respect to FIGS. 1-6. In some examples, the signal bearing medium 702 may encompass a non-transitory computer-readable medium 706, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDS, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 112 of FIG. 1 may be configured to provide various operations, functions, or actions in response to the programming instructions 704 conveyed to the computer system 112 by one or more of the computer readable medium 706, the computer recordable medium 708, and/or the communications medium 710. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
receiving, at a computing device, radar data from a radar unit coupled to a vehicle during vehicle operation in an environment, wherein the radar unit receives the radar data from the environment via an antenna array of the radar unit;
detecting an object in the environment based on the radar data;
determining that the detected object satisfies a set of conditions;
responsive to determining that the detected object satisfies the set of conditions, estimating a first phase array offset for the antenna array;
performing a comparison between the first phase array offset and a second phase array offset, wherein the second phase array offset represents a prior calibration for the radar unit;
based on a difference between the first phase array offset and the second phase array offset exceeding a threshold difference, adjusting operation of the radar unit according to the first phase array offset; and
based on the difference between the first phase array offset and the second phase array offset being less than the threshold difference, operating the radar unit according to the second phase array offset.

2. The method of claim 1, wherein determining that the detected object satisfies the set of conditions comprises:
determining that radar data indicative of the detected object exceeds both a signal-to-noise ratio (SNR) threshold and a range threshold; and
determine that the radar data indicative of the detected object represents a Doppler for the detected object that is within a predefined Doppler range.

3. The method of claim 1, wherein detecting the object in the environment comprises:
identifying a set of peaks such that each peak represents a different object in the environment; and
selecting training data corresponding to the identified set of peaks based on a plurality of channels that depend on operation of the antenna array of the radar unit.

4. The method of claim 3, wherein estimating the first phase array offset for the antenna array of the radar unit comprises:
performing a smoothing process to each peak of the identified set of peaks, wherein the smoothing process includes one or more of a phase calibration, a motion compensation, and a linear phase compensation; and
based on performing the smoothing process to each peak of the identified set of peaks, extracting error data from the training data, wherein the error data represents respective portions of the training data that differ from the identified set of peaks; and
estimating the first phase array offset based on the extracted error data.

5. The method of claim 4, wherein estimating the first phase array offset based on the extracted error data comprises:
determining a spatially invariant correction and a spatially variant correction based on the extracted error data; and
estimating the first phase array offset based on the determined spatially invariant correction and the determined spatially variant correction.

6. The method of claim 5, wherein determining the spatially invariant correction and the spatially variant correction comprises:
determining the spatially invariant correction and the spatially variant correction using a singular value decomposition process.

7. The method of claim 5, wherein adjusting operation of the radar unit according to the first phase array offset comprises:
adjust operation of the radar unit based on the determined spatially invariant correction and the determined spatially variant correction.

8. The method of claim 5, further comprising:
based on the determined spatially invariant correction and the determined spatially variant correction, generating an array impulse response; and
estimating a peak sidelobe level and a root-mean-square (RMS) sidelobe level; and
wherein performing the comparison between the first phase array offset and the second phase array offset comprises:
performing a given comparison between the estimated peak sidelobe level and the RMS sidelobe level to an existing peak sidelobe level and an existing RMS sidelobe level associated with the second phase array offset.

9. The method of claim 1, wherein the second phase array offset is based on an offline calibration process.

10. A system comprising:
a radar unit coupled to a vehicle; and
a computing device coupled to the vehicle, wherein the computing device is configured to:
receive radar data from the radar unit coupled to the vehicle during vehicle operation in an environment, wherein the radar unit receives the radar data from the environment via an antenna array of the radar unit;
detect an object in the environment based on the radar data;
determine that the detected object satisfies a set of conditions;
responsive to determining that the detected object satisfies the set of conditions, estimate a first phase array offset for the antenna array;
perform a comparison between the first phase array offset and a second phase array offset, wherein the second phase array offset represents a prior calibration for the radar unit;
based on a difference between the first phase array offset and the second phase array offset exceeding a threshold difference, adjust operation of the radar unit according to the first phase array offset; and
based on the difference between the first phase array offset and the second phase array offset being less than the threshold difference, operate the radar unit according to the second phase array offset.

11. The system of claim 10, further comprising:
a memory coupled to the vehicle, wherein the computing device is further configured to:
store the first phase array offset in the memory based on the difference between the first phase array offset and the second phase array offset exceeding the threshold difference.

12. The system of claim 10, wherein the computing device is further configured to:
determine that radar data indicative of the detected object exceeds both a signal-to-noise ratio (SNR) threshold and a range threshold; and determine that the radar data indicative of the detected object represents a Doppler for the detected object that is within a predefined Doppler range.

13. The system of claim 10, wherein the computing device is further configured to:
    identify a set of peaks such that each peak represents a different object in the environment; and
    select training data corresponding to the identified set of peaks based on a plurality of channels that depend on operation of the antenna array of the radar unit.

14. The system of claim 13, wherein the computing device is further configured to:
    perform a smoothing process to each peak of the identified set of peaks, wherein the smoothing process includes one or more of a phase calibration, a motion compensation, and a linear phase compensation; and
    based on performing the smoothing process to each peak of the identified set of peaks, extract error data from the training data, wherein the error data represents respective portions of the training data that differ from the identified set of peaks; and
    estimate the first phase array offset based on the extracted error data.

15. The system of claim 14, wherein the first phase array offset includes a spatially invariant correction and a spatially variant correction determined based on the extracted error data.

16. The system of claim 15, wherein the computing device is further configured to:
    adjust operation of the radar unit based on the spatially invariant correction and the spatially variant correction.

17. The system of claim 10, wherein the second phase array offset is based on an offline calibration process.

18. A method for calibrating a radar unit of a vehicle during operation of the vehicle comprising:
    navigating a vehicle having a radar unit past a plurality of objects at a first time frame, wherein a computing system coupled to the vehicle uses radio signals received by an antenna array of the radar unit while the vehicle is navigating to identify each object, and wherein each object is associated with a distance, a speed, and a signal-to-noise ratio;
    navigating the vehicle past the plurality of objects at a second time frame, wherein the second time frame occurs subsequent to the first time frame;
    performing a comparison between a first phase array offset associated with first radar signals received from the antenna array of the radar unit during the first time frame and a second phase array offset associated with second radar signals received from the antenna array of the radar unit during the second time frame;
    based on a difference between the first phase array offset and the second phase array offset exceeding a threshold difference, operating the radar unit according to the second phase array offset; and
    based on the difference between the first phase array offset and the second phase array offset being less than the threshold difference, operating the radar unit according to the first phase array offset.

19. The method of claim 18, wherein the plurality of object comprises at least one of: a car, a truck, a street sign, and a metallic object having a size equal to a car or larger.

* * * * *